March 24, 1959
L. W. ERATH
2,879,471
RESISTANCE METER
Filed Feb. 23, 1954
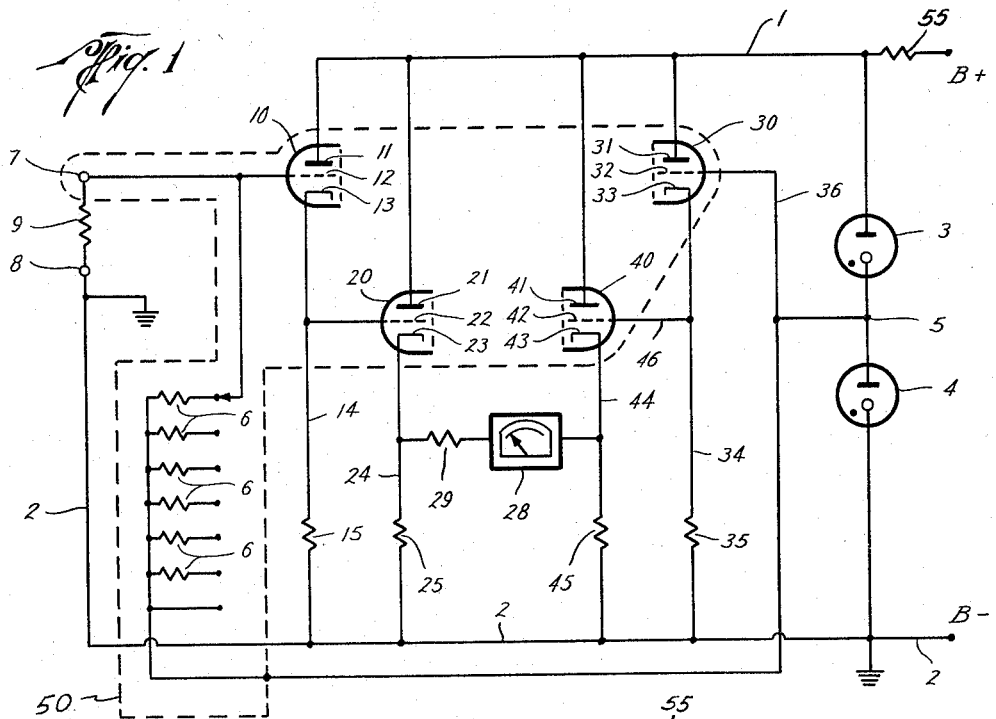
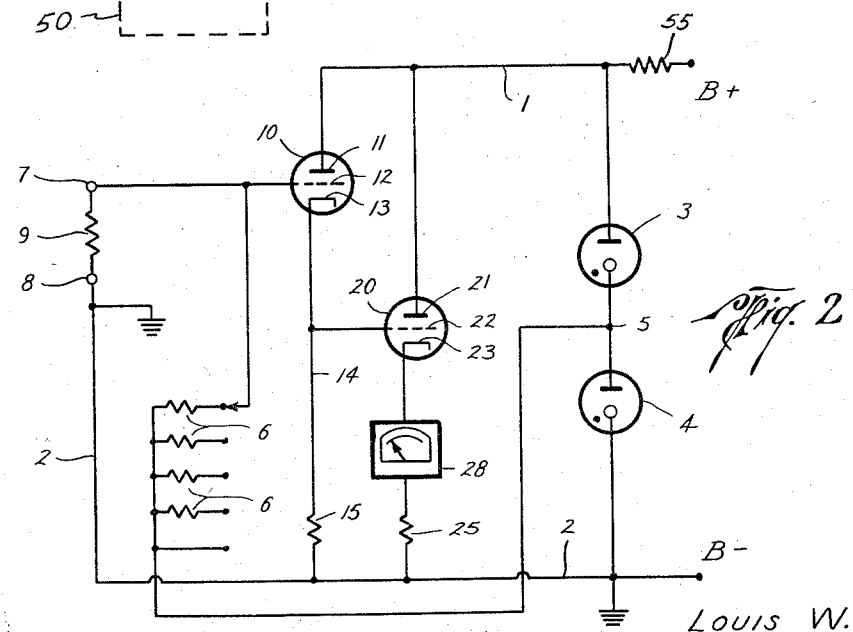
Louis W. Erath
INVENTOR.
BY Thomas O. Arnold
ATTORNEY United States Patent Office 2,879,471
Patented Mar. 24, 1959

2,879,471
RESISTANCE METER

Louis W. Erath, Houston, Tex., assignor, by mesne assignments, to Dresser Industries, Inc., Dallas, Tex., a corporation of Delaware Application February 23, 1954, Serial No. 411,677

19 Claims. (Cl. 324—62)

This invention relates to electrical metering devices, and more particularly to improved means for measuring electrical resistance.

Heretofore, various types of resistance meters have been known which use electron tubes. The accuracy of the measurements of these meters has always been seriously affected by grid current in the electron tubes. Particularly has this been so when extremely high resistances have been measured.

An object of this invention, therefore, is to provide an improved electronic resistance meter.

Another object of this invention is to provide an electronic resistance meter wherein the accuracy of measurments are not substantially affected by grid current in the electron tube or tubes.

A further object of this invention is to provide an electronic resistance meter wherein the grid current is of infinitesimal size.

Still another object is to provide an improved electronic resistance meter having a very high input impedance.

Yet another object is to provide an improved electronic resistance meter wherein high plate voltages may be used without effecting high grid currents.

An additional object of this invention is to provide an improved electronic resistance meter which is not subject to objectionable drift in zero setting.

Other objects are apparent from the following description and accompanying drawings.

These objects are accomplished in accordance with this invention by connecting the unknown resistance so that its value influences the grid voltage of a first cathode follower which is set up for operation with very low plate and grid current, and adapting that first cathode follower to drive a second cathode follower with a substantially higher plate current. The current to or potential of the cathode of the second cathode follower may then be used as a measure of the unknown resistance.

The invention is more easily understood by reference to the drawings wherein:

Figure 1 is a schematic simplified circuit diagram of a preferred embodiment of the invention.

Figure 2 is a schematic circuit diagram showing a second embodiment of the invention.

Consider first the more elementary circuit of Figure 2 wherein there is a single cathode follower set up to drive a second cathode follower. Any conventional source of plate voltage may be used. Figure 2 indicates a connection to B plus by a line 1, and to B minus by a line 2. Line 2 is also grounded.

Means are provided for deriving a voltage to be impressed upon the unknown resistance. Conveniently, this may take the form of a series connection between line 1 and line 2 of two voltage regulator tubes 3 and 4 which are connected to each other through a common terminal 5. A resistor 55 may be placed in line 1 between the connection of the first voltage regulator tube 3 and the B plus terminal. Terminal 5 may be maintained at a potential on the order of 105 volts. This potential is connected through any one of a number of known resistors 6 to a terminal 7. The terminal 7 and a terminal 8, which may be connected to the line 2 or grounded, are adapted to receive an unknown resistance 9 thereacross. If the unknown has an infinite resistance, the terminal 7 assumes a potential equal to terminal 5. But, if a current leaks or flows through the unknown 9, then there is a voltage drop across the resistor 6 and the terminal 7 assumes some lower potential that is indicative of the resistance of the unknown.

Means are therefore provided for measuring the potential of the terminal 7. It is important, however, that this measurement means draw no appreciable current, because such current, flowing through the resistor 6, would affect the potential of the terminal 7 and thereby affect the accuracy of the determination of the unknown resistance.

Accordingly, there is provided a cathode follower tube 10. This tube may be of a variety of types, but it includes at least an anode 11, grid 12, and cathode 13. A line 14 connects the cathode 13 to a cathode 13 to a cathode resistor 15.

The plate 11 is connected to B plus, through line 1; the cathode desistor 15 is connected to B minus through line 2.

The grid 12 is connected to the terminal 7 so that fluctuations in the potential of the terminal 7 may control the plate current in the tube 10. The grid current is negligible when the plate current of the tube 10 is kept very low. Accordingly, the cathode resistor 15 is of large size, such as 5 megohms, so as to limit the plate current in the tube 10 to a very small value, on the order of $20 \times 10^{-6}$ amperes or less. Note that the plate voltage impresseed upon the tube 10 may be high enough to ionize the gases in the tube, but the space current in the tube is nevertheless kept sufficiently low to minimize the amount of gas that is ionized, thereby minimizing grid current without using electrometer tubes or other unconventional tubes.

A plate current of such a small value is inadequate for proper operation of any preferred meter. Accordingly, means are provided for amplifying this current. In accordance with this invention, a second cathode follower tube 20, with at least an anode 21, grid 22, and cathode 23, is used. The anode 21 is connected to B plus through line 1. The grid 22 is connected to the line 14 between the cathode 13 and resistor 15 of the first cathode follower. The second cathode follower also has a cathode resistor 25, connected to B minus by line 2.

This cathode resistor 25 is much smaller than the cathode resistor 15, as, for example, 25 times smaller. When the cathode resistor 15 is 5 megohms, for example, it has been found satisfactory to use a .2 megohm resistor for the cathode resistor 25. This ratio of cathode resistors limits the plate current in the first tube 10 to very small value, while permitting a high plate current in the second tube 20—high enough to activate a meter.

An ammeter 28 is placed in the cathode circuit of the second tube 20, between the cathode 23 and the cathode resistor 25.

In the operation of this embodiment of the invention, the plate voltage supply is first energized. The unknown is removed from between the terminals 7 and 8 so that the "unknown" resistance is infinity. Since the plate current in tube 10 is very small, no appreciable grid current flows, and the grid 12 of the first tube 10 assumes exactly the voltage of the terminal 5.

The ammeter 28 is then set at infinity. The unknown resistance is then connected across the terminals 7 and 8, A current commences to flow through one of the resistors 6, terminal 7 and the unknown 9 to ground. The voltage drop across the resistor 6 reduces the positive potential on the grid 12, decreasing the plate current in the tube 10.

This decrease in current flowing through the cathode resistor 15 causes a decrease in the potential on the grid 22 of the second tube 20, and effects a decrease in the plate current in the second tube 20. The ammeter 28 indicates this current change. Conveniently, the ammeter 28 may be calibrated in ohms or some multiple thereof so that a direct reading of resistance may be taken from is scale. If an unknown of still lower resistance is inserted between the terminals 7 and 8, there is a corresponding decrease in the current through the ammeter 28 which the meter indicates as ohms of resistance.

If the unknown is a condenser, the ammeter may be calibrated to indicate the current leaking therethrough. If the unknown is the insulation of a transformer winding, the reading may again be a reading of leaking current. Or this reading may be transposed into ohmic readings as aforesaid.

This embodiment of the invention, using an unbalanced circuit, is subject to a slow drift of the zero setting due to gradual increases in temperature of the tube heater after the circuit is first turned on, or due to changes in heater power, sometimes necessitating a readjustment of the zero setting on the meter 28 before each reading.

Accordingly, the preferred embodiment of the invention uses a balanced circuit as illustrated in Figure 1. Again there is a first tube 10 with at least an anode 11, grid 12 and cathode 13, and a second tube 20 with at least an anode 21, grid 22 and cathode 23. A cathode resistor 15 is connected directly to the cathode 13, and a cathode resistor 25 is connected directly to the cathode 23. Both cathode resistors are also connected to B minus through line 2. The resistor 55 is in line 1 adjacent the B plus terminal. The plates 11 and 21 are both connected to B plus through line 1. Line 2, i.e. B minus, is grounded.

The unknown 9 is again placed between the grounded terminal 8 and the terminal 7 which is connected to the grid 12. The voltage regulator tubes 3 and 4 connected in series between B plus and M minus, maintain the intermediate terminal 5 at a predetermined voltage. The terminal 5 is connected through any one of a series of known resistors 6 to the grid 12 and to the terminal 7.

In this preferred embodiment, however, there is a third cathode follower tube 30 with at least an anode 31, grid 32, and cathode 33 which is connected by a line 34 through a cathode resistor 35 to B minus. There is also a fourth cathode follower tube 40 with at least an anode 41, grid 42, and cathode 43 which is connected by a line 44 through a cathode resistor 45 to B minus.

The grid 32 of the third cathode follower tube 30 is connected by a line 36 to the terminal 5. The grid 42 of the fourth cathode follower tube 40 is connected by a line 46 and the line 34 to the cathode 33 of the third tube 30. The two plates 31 and 41 are connected to B plus via line 1.

In this embodiment, the meter 28 is connected between the two cathodes 23 and 43 and is preferably of the high resistance voltmeter type. There may be a resistor 29 in series with the meter 28.

Conveniently, the first tube 10 and the third tube 30 may be the two halves of a 12AY7 double triode and the second tube 20 and the fourth tube 40 may be the two halves of a 12AT7 double triode. The cathode resistors 15 and 35 may be on the order of 5 megohms, and the cathode resistors 25 and 45 on the order of .2 megohms. The various known grid resistors 6 may be multiples of a predetermined value, such as .004 M, .04 M, .4 M, 4 M, 40 M, 400 M, and 4000 M. It is also desirable to shield the four tubes, the grid resistors 6 and the terminal 7 with a guard ring 50 maintained at the same voltage as the terminal 5. The two voltage regulator tubes 3 and 4 may be of the OB2 type.

A study of this circuit reveals that it affords a balanced operation wherein the measurement of the ammeter is in reality a comparison of the voltages of the cathode 23 of the tube 20 and the cathode 43 of the tube 40. This measurement is not appreciably affected by variations in the plate voltage, since tube 10 and its balancing counterpart tube 30, and tube 20 and its balancing counterpart tube 40 are all affected in like manner. Similarly, any variation in the potential of the terminal 5 affects both tube 10 and its balancing counterpart tube 30 in the same manner.

In the operation of this embodiment, just as in the previously described embodiment, any current flowing through the unknown 9 results in a decrease in plate current in tube 10 and a decrease in the plate current in tube 20. This decreased current flows through the cathode resistor 25, causing a decrease in the potential of the cathode 23. Any difference between the potential of the cathode 23 and the cathode 43 is indicated on the meter 28. Note that in this embodiment, the meter is taken out of the cathode circuit, and may be of a high resistance voltmeter type so that the power required to actuate it does not in any way affect the accuracy of the readings.

When there is no unknown connected between the two terminals 7 and 8, i.e., when the unknown is infinity, then the circuit is exactly balanced and the meter indicates a zero voltage difference between the two cathodes 23 and 43, or an infinite "unknown" resistance. If there should be a slight voltage difference due to imperfections in the uniformity of circuit elements, this is of no concern. The pointer of the meter may be set at infinity. When a resistance is placed between the terminals 7 and 8, however, a voltage difference will arise between the cathodes 23 and 43 which the meter indicates either as current leakage or as resistance, as desired.

If the unknown is a very high resistance and a 4000 megohm known grid resistor 6 is used, there will not be sufficient flow of current through the grid resistor 6 to effect a substantial potential drop at the resistor. In this event, a smaller grid resistor, such as 40 megohms, or .4 megohm may be used, and the reading taken from the scale of the meter 28 is multiplied by an appropriate multiple. Hence, a wide range of measurements is possible by the choice of the various grid resistors 6.

Note that the potential of the cathode 23 of the tube 20 is determined by the amount of current flowing through this tube. A measurement of either current flow to the cathode 23, or of the potential of the cathode 23, is indicative of the value of the unknown resistance. The circuitry of Figure 2 wherein the meter 28 is placed in the cathode circuit of tube 20, and the circuitry of Figure 1 wherein the meter 28 measures current flow resulting from a difference between the potential of the cathode 23 and another predetermined potential, are both, in practical result, merely means for measuring the current flow to the cathode 23 of tube 20. Both arrangements constitute meter means responsive to current flow to the cathode 23 of the tube 20. Other circuits which amount to the same practical result, namely measurement of current flow to the cathode 23 of the tube 20, may also be used.

The foregoing description is illustrative only and is not to be construed as any limitation upon the invention as defined in the following claims.

I claim:

1. Electrical apparatus comprising a first line adapted for connection to the plus terminal of a source of direct current power; a second line adapted for connection to the minus terminal of said source of direct current power; a first and a second electron tube, each having at least an anode, a grid and a cathode, the anodes of each of said tubes being connected to said first line and the grid of said second tube being connected to the cathode of said first tube; a first cathode resistor with the first terminal thereof connected to said second line and with the second terminal thereof connected to the cathode of said first tube; a second cathode resistor with the first terminal thereof connected to said second line, said second cathode resistor being of smaller value than said first cathode resistor; circuit means connecting the second terminal of said second cathode resistor to the cathode of said second tube; meter means responsive to the current flow to the cathode of said second tube; a predetermined grid resistor with two terminals, the first terminal thereof being connected to the grid of said first tube; a source of predetermined voltage connected to the second terminal of said grid resistor and to some other point in the circuit so as to establish the potential of said second terminal at a predetermined value more positive than the first terminal of said first cathode resistor; and circuit means adapted for connecting an unknown resistance between the grid of said first tube and said second line.

2. Electrical apparatus comprising a first line adapted for connection to the plus terminal of a source of direct current power; a second line adapted for connection to the minus terminal of said source of direct current power; a first and a second electron tube, each having at least an anode, a grid and a cathode, the anodes of each of said tubes being connected to said first line; a first and a second cathode resistor, each having one terminal connected to the cathode of one of said tubes and each having the second terminal connected to said second line; a predetermined grid resistor with two terminals, the first terminal thereof being connected to the grid of said first tube; means for applying a predetermined voltage to the second terminal of said grid resistor and to the grid of said second tube, so as to maintain the potential of said second terminal of said grid resistor and of said grid of said second tube at a predetermined value more positive than the second line; circuit means for connecting an unknown resistance between the grid of said first tube and said second line; a third and a fourth electron tube, each having at least an anode, grid and cathode, the anodes of each of said third and fourth tubes being connected to said first line; a third and a fourth cathode resistor, each having one terminal connected to the cathode of one of said third and fourth electron tubes and each having the second terminal connected to said second line, said third and fourth cathode resistors being of smaller resistance than said first and second cathode resistors; electric circuit means connecting the grid of said third tube to the cathode of said first tube; electric circuit means connecting the grid of said fourth tube to the cathode of said second tube; electric circuit means connecting the cathode of said third tube and the cathode of said fourth tube; and means for measuring current in said last mentioned circuit means.

3. The apparatus described in claim 1, characterized by the further addition of a guard ring surrounding all of the said tubes and said grid resistor, said guard ring being adapted to be impressed with the same voltage as that impressed upon the grid to said second tube.

4. Electrical apparatus comprising a cathode follower including a cathode, a grid, an anode, and a cathode resistor with a first terminal connected to said cathode; said anode being adapted for connection to the plus side of a source of direct current power and the second terminal of said cathode resistor being adapted for connection to the minus side of said source of direct current power; means for connecting an unknown resistance between the grid of said cathode follower and the second terminal of said cathode resistor and for applying a potential to be measured to said grid so that the amount of said potential depends upon the resistance of said unknown resistance; a second cathode follower including cathode, grid, anode and a cathode resistor; circuit means for connecting the anodes of both cathode followers together; circuit means for connecting the grid of said second cathode follower to the cathode of said first cathode follower; circuit means for connecting the second terminal of the cathode resistors of both cathode followers together; circuit means for connecting the first terminal of the cathode resistor of said second cathode follower to the cathode of said second cathode follower; and means for measuring the cathode current of said second cathode follower.

5. Electrical apparatus comprising a first cathode follower including cathode, grid and anode and adapted to have a very low plate current; a grid resistor with a first terminal connected to said grid; a second cathode follower including cathode, grid and anode and adapted to have a plate current of substantially greater value than the plate current in said first cathode follower, the grid of said second cathode follower being connected to the cathode of said first cathode follower; a third cathode follower substantially identical with said first cathode follower; a fourth cathode follower substantially identical to said second cathode follower, the grid of said fourth cathode follower being connected to the cathode of said third cathode follower; and means for connecting an unknown resistance between the grid of said first cathode follower and ground; circuit means for impressing a predetermined voltage upon the grid of said third cathode follower and upon the second terminal of said grid resistor; means for comparing the potential of the cathode of said second cathode follower with the potential of the cathode of said fourth cathode follower.

6. Electrical apparatus comprising a first anode, first grid and first cathode adapted for electrical cooperation with each other; a second anode, second grid and second cathode adapted for electrical cooperation with each other; means for applying substantially uniform voltage between both of said anodes and ground; means connecting said second grid to said first cathode; a first impedance of large value connected between said first cathode and ground to limit the current to said first cathode to sufficiently small values whereby first grid current is kept at very small values; a second impedance of value relatively much smaller than said first impedance connected between said second cathode and ground; an indicating device connected to be responsive to the flow of current to the second of said cathodes; means for applying a potential to be measured to said first grid, the amount of said potential depending upon the resistance of a device being tested.

7. The apparatus defined in claim 6 wherein said first cooperating anode, grid and cathode are housed in an envelope containing gas, and wherein said voltage applying means applies a voltage between the first anode and the first cathode which is greater than that required to ionize the gas in said envelope.

8. Electrical apparatus comprising the combination of a first anode, first grid and first cathode adapted for electrical cooperation with each other; a second anode, a second grid and second cathode adapted for electrical cooperation with each other; a third anode, a third grid and a third cathode adapted for electrical cooperation with each other; a fourth anode, a fourth grid and a fourth cathode adapted for electrical cooperation with each other; a first cathode resistance connected to said first cathode; a second cathode resistance connected to said second cathode; a third cathode resistance connected to said third cathode; a fourth cathode resistance connected to said fourth cathode; said first and third cathode resistances being of relatively large values so as to limit the cathode current to very small values, thereby limiting grid current to said first and third grids to very small values; said second and fourth cathode resistances being of relatively small value so as to permit cathode currents of sizable and easily measured values; said second grid being connected to said first cathode and said fourth grid being connected to said third cathode; indicating means connected between said second and fourth cathodes; means for applying a potential to be measured to said first grid, the amount of said potential depending upon the resistance of a device being tested; and means for maintaining said third grid at a substantially constant potential.

9. The invention defined in claim 8, wherein each of said first and third cooperating anode, grid and cathodes are housed in an envelope containing gas, and wherein said first and third cooperating anode and cathode are connected to some source of potential substantially greater than that required to ionize the gas in said envelope.

10. The invention defined in claim 1, wherein said first electron tube contains gas, and wherein said first line and said second line are connected across some source of potential substantially greater than that required to ionize the gas in said tube.

11. The invention defined in claim 2, wherein said first and second electron tubes each contain gas, and wherein said first and second lines are connected across some source of potential substantially greater than that required to ionize the gas in said tube.

12. The invention defined in claim 3, wherein said first electron tube contains gas, and wherein said first line and said second line are connected across some source of potential substantially greater than that required to ionize the gas in said tube.

13. The invention defined in claim 4, wherein the anode, grid and cathode of said first cathode follower are housed in an envelope containing gas, and wherein the anode and cathode of said first cathode follower are connected to some source of potential substantially greater than that required to ionize such gas.

14. The invention defined in claim 5, wherein the anode, grid and cathode of said first and third cathode followers are each housed in an envelope containing gas, and wherein the anode and cathode of said first and third cathode followers are each connected across some source of potential greater than that required to ionize such gas.

15. Apparatus for measuring the magnitude of an unknown resistance comprising a first cathode follower including a first cathode resistor, cathode, grid and anode, said first cathode resistor being connected between the cathode of said first cathode follower and ground, means for connecting an unknown resistance between the grid of said first cathode follower and ground and for impressing a voltage across said unknown resistance, a second cathode follower including a second cathode resistor, cathode, grid and anode, having its grid connected to the cathode of said first cathode follower, an anode voltage source connected to energize both said cathode followers, and means connected to the cathode of said second cathode follower for measuring the cathode current thereof, said first cathode resistor having a very high resistance so as to permit only a small amplitude of plate current to flow through said first cathode follower and said second cathode resistor having a very much lower resistance to permit a larger plate current to flow in the second cathode follower.

16. Electrical apparatus comprising a cathode follower including a cathode resistor, cathode, grid and anode and adapted to have a very low plate current, said cathode resistor being connected between cathode and ground; means for connecting an unknown resistance between the grid of said cathode follower and ground and for impressing a voltage upon said unknown resistance; a second cathode follower including cathode, grid and anode adapted to have a plate current of substantially greater value than the plate current in said first-mentioned cathode follower; means connecting the grid of said second cathode follower to the cathode of said first-mentioned cathode follower; a voltage source connected to energize both of said cathode followers; and means connected to the cathode of said second cathode follower for measuring the cathode current thereof.

17. The apparatus of claim 16 in which the envelope of said first cathode follower contains gas and the voltage applied between cathode and anode thereof by said anode potential source is substantially greater than the ionization potential of such gas.

18. Electrical apparatus comprising a cathode follower including a cathode resistor, cathode, grid and anode and adapted to have a very low plate current, said cathode resistor being connected between cathode and ground; means for connecting an unknown resistance between the grid of said cathode follower and ground and for impressing a voltage upon said unknown resistance; a second cathode follower including cathode, grid and anode adapted to have a plate current of substantially greater value than the plate current in said first-mentioned cathode follower; means connecting the grid of said second cathode follower to the cathode of said first-mentioned cathode follower; a voltage source connected to energize both of said cathode followers; a source of comparison potential; and means connected to the cathode of said second cathode follower to compare that cathode potential with said comparison potential.

19. The apparatus of claim 18, in which the envelope of said first cathode follower contains gas and the voltage applied between cathode and anode thereof by said anode potential source is substantially greater than the ionization potential of such gas.

References Cited in the file of this patent

UNITED STATES PATENTS

| | | |
|---|---|---|
| 2,033,465 | Graham | Mar. 10, 1936 |
| 2,272,239 | Delmhorst | Feb. 10, 1942 |
| 2,360,523 | Simmons | Oct. 17, 1944 |
| 2,507,324 | Taborsky | May 9, 1950 |
| 2,563,062 | Perley | Aug. 7, 1951 |
| 2,695,987 | McCollom et al. | Nov. 30, 1954 |
| 2,728,048 | Priedigkeit | Dec. 20, 1955 |
| 2,769,957 | Zito | Nov. 6, 1956 |
| 2,771,583 | Bloch | Nov. 20, 1956 |

OTHER REFERENCES

Wireless World, November 1953, pages 516–521, article by Scroggie.